United States Patent
House

(10) Patent No.: US 6,847,392 B1
(45) Date of Patent: Jan. 25, 2005

(54) THREE-DIMENSIONAL STRUCTURE ESTIMATION APPARATUS

(75) Inventor: Gregory House, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/962,315

(22) Filed: Oct. 31, 1997

(30) Foreign Application Priority Data

Oct. 31, 1996 (JP) .............................................. 8-290377

(51) Int. Cl.[7] .............................................. H04N 7/00
(52) U.S. Cl. ........................... 348/36; 348/47; 348/140; 348/141; 348/143; 382/106; 382/154
(58) Field of Search .............................. 348/36, 39, 42, 348/47, 61, 135, 139–140; 356/3, 3.13, 3.14, 3.15, 3.16, 4.01, 4.03, 9, 12, 13; 382/104, 106, 154

(56) References Cited

U.S. PATENT DOCUMENTS

| | | | | |
|---|---|---|---|---|
| 4,028,725 A | * | 6/1977 | Lewis | 348/115 |
| 4,965,840 A | * | 10/1990 | Subbarao | 382/106 |
| 5,045,929 A | * | 9/1991 | Rabii | 348/669 |
| 5,193,124 A | * | 3/1993 | Subbarao | 382/255 |
| 5,365,597 A | * | 11/1994 | Holeva | 382/8 |
| 5,477,332 A | * | 12/1995 | Stone et al. | 356/371 |
| 5,751,450 A | * | 5/1998 | Robinson | 358/504 |
| 5,764,285 A | * | 6/1998 | Ochi et al. | 348/222 |
| 5,809,161 A | * | 9/1998 | Auty et al. | 382/104 |
| 5,835,265 A | * | 11/1998 | Mammone | 359/383 |
| 5,846,185 A | * | 12/1998 | Carollo et al. | 600/166 |
| 5,892,855 A | * | 4/1999 | Kakinami et al. | 382/291 |
| 6,061,086 A | * | 5/2000 | Reimer et al. | 348/125 |
| 6,219,462 B1 | * | 4/2001 | Anandan et al. | 382/294 |

FOREIGN PATENT DOCUMENTS

| | | |
|---|---|---|
| JP | 8007102 | 1/1996 |
| JP | 8043055 | 2/1996 |

OTHER PUBLICATIONS

M. Okutomi, et al., "A Multiple–Baseline Stereo", *IEEE*, vol. 15, No. 4, pp. 353–363, Apr. 1993.

A. Luo, et al., "An Intensity–Based Cooperative Bidirectional Stereo Matching with Simultaneous Detection of Discontinuities and Occlusions", pp. 171–188, International Journal of Computer Vision, vol. 15, 1995.

D. Geiger, et al., "Occlusions and Binocular Stereo", *International Journal of Computer Vision*, vol. 14, pp. 211–226, 1995.

S. B. Kang, et al., "An Active Multibaseline Stereo System with Real–time Image Acquisition", pp. 1325–1334, 1994.

I.J. Cox, "A Maximum Likelihood N–Camera Stereo Algorithm", *IEEE*, pp. 1–23, 1994.

(List continued on next page.)

*Primary Examiner*—Shawn S. An
(74) *Attorney, Agent, or Firm*—Foley & Lardner LLP

(57) ABSTRACT

A three-dimensional structure estimation apparatus by which an image of a wide visual field and another image which has a high resolution at part of the visual field are provided and a high resolution three-dimensional structure of an object in the visual field can be estimated is disclosed. A wide visual field image and a narrow visual field image outputted from cameras which have a wide visual field cone and a narrow visual field cone of different visual fields and produce images of different resolutions are converted into images whose pixel units are equal in magnitude by a conversion section. The conversion section includes a sampling section which samples pixels of the narrow visual field image to produce a coincident pixel unit image which has a pixel unit coincident with that of the wide visual field image, and a depth image production section which receives and compares the wide visual field image and the coincident pixel unit image with each other to produce a depth image. Preferably, the sampling section produces a plurality of images of coincident pixels by successively displacing sampling positions little by little so that the depth distance can be estimated with a higher degree of accuracy.

12 Claims, 6 Drawing Sheets

OTHER PUBLICATIONS

W. Tech, et al., "An Inexpensive Stereoscopic Vision System for Robots", *IEEE* pp. 186–189, 1984.

A. Goshtasby, et al., "Design of a Single–Lens Stereo Camera System", *Pattern Recognition*, vol .26, pp. 923–937, 1993.

S. Shah, et al., "Depth Estimation Using Stereo Fish–Eye Lenses", *IEEE*, pp. 740–744, 1994.

D. H. Ballard, et al., "Principles of Animate Vision", *CVGIP: Image Understanding* vol. 58, pp. 3–21, 1992.

* cited by examiner

FIG. 5

COLUMN

| | 1 | 2 | 3 | 1 | 2 | 3 | 1 | 2 | 3 |
|---|---|---|---|---|---|---|---|---|---|
| 1 | | | | | | | | | |
| 2 | 1 | 2 | 3 | 1 | 2 | 3 | 1 | 2 | 3 |
| 3 | | | | | | | | | |
| 1 | | | | | | | | | |
| 2 | 1 | 2 | 3 | 1 | 2 | 3 | 1 | 2 | 3 |
| 3 | | | | | | | | | |
| 1 | | | | | | | | | |
| 2 | 1 | 2 | 3 | 1 | 2 | 3 | 1 | 2 | 3 |
| 3 | | | | | | | | | |

THREE-DIMENSIONAL STRUCTURE ESTIMATION APPARATUS

BACKGROUND OF THE INVENTION

1. Field of the Invention

This invention relates to a three-dimensional structure estimation apparatus which measures a depth distance of an object on an image and outputs a depth image in application fields in which a depth distance to an object on a image is estimated in the field of computer vision including such fields of supervision of an object, automatic operation and robot automation.

2. Description of the Related Art

In the field of computer vision, a stereo method is utilized popularly as a method of obtaining three-dimensional information from two-dimensional information. The stereo method is a useful technique for obtaining three-dimensional information from paired two-dimensional images. One of such techniques is disclosed, for example, in M. Okutomi and T. Kanade, "A multiple-baseline stereo", IEEE Transactions on Pattern Analysis and Machine Intelligence, Vol. 15, No. 4, April, 1993, pp.353–363 (reference document 1). The technique of the reference document 1 is devised so as to allow processing in a comparatively short calculation time comparing with other stereo methods.

A representative construction of a three-dimensional structure estimation apparatus which employs a conventional stereo method is shown in FIG. 6.

Referring to FIG. 6, a pair of cameras 600 and 601 having a same visual field are placed in a spaced relationship from each other on one baseline 602. The cameras 600 and 601 have optical axes 603 and 604, respectively, which intersect with each other at one point as seen from thick solid lines in FIG. 6.

Meanwhile, a visual field range 605 of the camera 600 is indicated by broken lines. The angular aperture defined by the broken lines is defined as a visual field of the camera 600. Similarly, the angular aperture of a visual field range 606 of the camera 601 is a visual field of the camera 601. The three-dimensional structure estimation apparatus is based on the principle of triangulation that the distance is based on in which directions a point on the surface of an object is observed from the positions of the paired cameras 600 and 601 in a region defined by the visual field ranges 605 and 606 of the cameras 600 and 601 positioned at the stereo positions.

Investigations for the stereo method are continued also at present, and another method is disclosed, for example, in A. Luo and H. Burkard, "An intensity-based cooperative bidirectional stereo matching with simultaneous detection of discontinuities and occlusions", International Journal of Computer Vision, No. 15, 1995, pp. 171–188 (reference document 2).

In a basic stereo method, coordinate positions of a certain location is searched, such as one point in a three-dimensional space corresponding to images of different cameras, based on suitable coincidence degrees of characteristics and pattern distributions of the images. Here, it is measured by which amounts the locations on the images corresponding to the same point in the three-dimensional space are displaced and the depth distance of the point is calculated from the measured amounts and the positions and the directions of the cameras. The amount of the displacement of each position on the corresponding image is defined as disparity.

Various conventional stereo methods are characterized in variation in amount (brightness, edge, texture and so forth) used upon searching of a location corresponding to a same point in a three-dimensional space, handling of any region which is behind an object and cannot be seen from paired cameras, handling of an image in which very similar patterns appear periodically, and so forth.

Handling of a region which is behind an object and cannot be seen from paired cameras is disclosed, for example, in D. Geiber, B. Landendorf and A. Yuille, "Occlusions and binocular stereo". International Journal of Computer Vision, No. 14, 1995, pp.211–226 (reference document 3).

Meanwhile, hardware constructions used for stereo methods do not have many variations.

A first variation is to increase the number of cameras to be used from two, which is a standard number, to three or more. This technique is disclosed, for example, in S. B. Kang, J. Webb, C. Zitnick and T. Kanade, "An active multibaseline stereo system with real-time image acquisition". Image Understanding Workshop, 1994, pp.1,325–1,335 (reference document 4).

It is to be noted that a technique which uses such a construction as just described but proposes a different algorithm is disclosed, for example, in I. J. Cox, "A maximum likelihood n-camera stereo algorithm", International Conference on Pattern Recognition, 1994, pp.437–443 (reference document 5).

A second variation is to multiplex a plurality of images which are different in time or space using a plurality of reflecting mirrors so as to allow application of a stereo method only with a single camera. This technique is disclosed, for example, in W. Teoh and X. D. Zhang, "An inexpensive stereoscopic vision system for robots". Proc. Int. Conf. Robotics, 1984, pp.186–189 (reference document 6).

Further, a technique wherein images from two positions are multiplexed and introduced into a single camera by reflecting mirrors is disclosed, for example, in A. Goshtasby and W. A. Gruver, "Design of a single-lens stereo camera system", Pattern Recognition. Vol. 26, No. 6, 1993, pp.923–937 (reference document 7).

A third variation is to utilize a camera on which a fisheye lens is mounted in order to construct a three-dimensional structure estimation apparatus having a wide visual field. This technique is disclosed, for example, in S. Shah and J. K. Aggarwal, "Depth estimation using stereo fish-eye lenses", Proc. IEEE International Conference, 1994, pp.740–744 (reference document 8).

In a stereo method, it is necessary that each point on the surface of an object is similar on a plurality of images. Therefore, in conventional systems, two or more cameras of the same type on which same lenses are mounted are arranged comparatively nearly to each other to prevent their output images from becoming much different from each other.

Consequently, the resultant display images have an equal resolution. Further, since the directions of the lines of sight or the positions of the cameras are not much different from each other, from the point of view that an image imaged by a single camera is processed, the difference between the images is comparatively small and information included in the images is very redundant. From this fact, since an additionally provided camera provides only information to be used by a stereo method, it can be considered that much wasteful information is provided by the camera.

Of the various conventional three-dimensional structure estimation apparatus described above, the three-dimensional structure estimation apparatus shown in FIG. 6 has a problem in that, where each of the stereo cameras 600 and 601 which form a stereo pair have only narrow visual fields, it is difficult to measure an imaging object placed in a long depth distance range. The reason is that an imaging target can be imaged by the two cameras only in a common visual field region 607 in which the visual field ranges 605 and 606 of the cameras 600 and 601 overlap with each other and which is a comparatively small space (space defined by thick broken lines in FIG. 6).

The problem just described is discussed in D. H. Ballard and C. M. Brown, "Principles of animate vision". CVGIP Image Understanding, Vol. 56, No. 1, July, 1992, pp.3–21 (reference document 9).

Further, the common visual field region 607 in which the visual field ranges 605 and 606 of the cameras 600 and 601 overlap with each other looks as if it covers a large distance range between a point at a shortest depth distance 608 from the baseline 602 to the nearest intersecting location between the visual field ranges 605 and 606 and another point at a longest depth distance 610 to the farthest intersecting location as seen in FIG. 6. However, since an imaging target to be measured usually has a certain magnitude, in order to estimate a three-dimensional structure over a range as wide as possible by a single imaging operation, it is most efficient that the object be present at or around the point at a maximum width distance 609.

A possible solution to the problem just described is a stereo system wherein the relative angle between the cameras is adjusted to adjust the maximum width distance 609. Such variation of the relative angle can be realized by mechanically controlling the cameras, for example, using paired electrically controlled motors provided at base portions of the cameras. This, however, gives rise to different problems that the three-dimensional structure estimation apparatus is mechanically complicated and that an error occurs with the position of each camera.

Since camera position information is utilized upon calculation of a three-dimensional position of an object, if an error is included in a camera position, the accuracy in measurement is deteriorated by the error.

On the other hand, where the stereo cameras 600 and 601 paired with each other individually have wide visual fields, while the three-dimensional structure estimation apparatus has a wide measurement range, since the area of the surface of the object per unit pixel on an image is large, the resolution is low and the accuracy upon measurement of the depth distance is sacrificed.

Thus, a wide visual field and a high resolution or a high degree of accuracy in measurement have a relationship of a tradeoff, and the conventional apparatus do not satisfy both of the requirements.

SUMMARY OF THE INVENTION

It is an object of the present invention to provide a three-dimensional structure estimation apparatus by which a wide visual field, depth estimation with a high degree of accuracy and acquisition of an image of a high resolution can be achieved the same time.

In order to attain the objects described above, according to an aspect of the present invention, there is provided a three-dimensional structure estimation apparatus which measures a depth distance to an object on an image and outputs a depth image, comprising a plurality of cameras having different visual fields from each other, conversion means for converting images outputted from the cameras into images whose pixel units are equal in magnitude, and a depth image production section for comparing the images whose pixel units are equal in magnitude to calculate a depth distance of the object on the image to produce a depth image and outputting the depth image.

The three-dimensional structure estimation apparatus may comprise a plurality of cameras for producing images having different resolutions from each other in place of or in addition to the plurality of cameras having different visual fields from each other.

In the three-dimensional structure estimation apparatus, where a plurality of cameras having different visual fields from each other are employed, a common visual field region larger than ever can be obtained. Meanwhile, where a plurality of cameras having different resolutions from each other are employed, for example, information of a comparatively high density is obtained in a central region of an image while information of a comparatively low density over a wide range is obtained in the other regions around the central region.

With the three-dimensional structure estimation apparatus, since a plurality of cameras having different visual fields from each other and/or a plurality of cameras having different resolutions from each other are used and images outputted from the cameras are converted into images whose pixel units are equal in magnitude so as to allow subsequent stereo calculation, while a conventional stereo algorithm can be utilized, a depth with a high degree of accuracy over a wide visual field which cannot be obtained by any conventional stereo method can be estimated, and an image having a high resolution at part of the visual field can be obtained.

According to another aspect of the present invention, there is provided a three-dimensional structure estimation apparatus which measures a depth distance to an object on an image and outputs a depth image, comprising a plurality of cameras for producing images having different visual fields from each other, conversion means for converting the images produced by the cameras into images whose pixel units are equal in magnitude by parallel movement by different movement amounts, and a depth image production section for comparing the images whose pixel units are equal in magnitude to calculate a depth distance to the object on the image to produce a depth image and outputting the depth image.

The three-dimensional structure estimation apparatus may include a plurality of cameras for producing images having different resolutions from each other in place of or in addition to the plurality of cameras having different visual fields from each other.

Also with the three-dimensional structure estimation apparatus, since a plurality of cameras having different visual fields from each other and/or a plurality of cameras having different resolutions from each other are used and images outputted from the cameras are converted into images whose pixel units are equal in magnitude so as to allow subsequent stereo calculation, while a conventional stereo algorithm can be utilized, a depth with a high degree of accuracy over a wide visual field which cannot be obtained by any conventional stereo method can be estimated. Further, an image having a high resolution at part of the visual field can be obtained.

Further, with the three-dimensional structure estimation apparatus, since matching in magnitude of pixel units is examined particularly, a depth distance with a higher degree of accuracy can be obtained.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 5 is a diagrammatic view illustrating a form of pixel arrangement by a sampling section of the three-dimensional structure estimation apparatus shown in FIG. 1 or 3.

DESCRIPTION OF THE PREFERRED EMBODIMENTS

Figure 1:
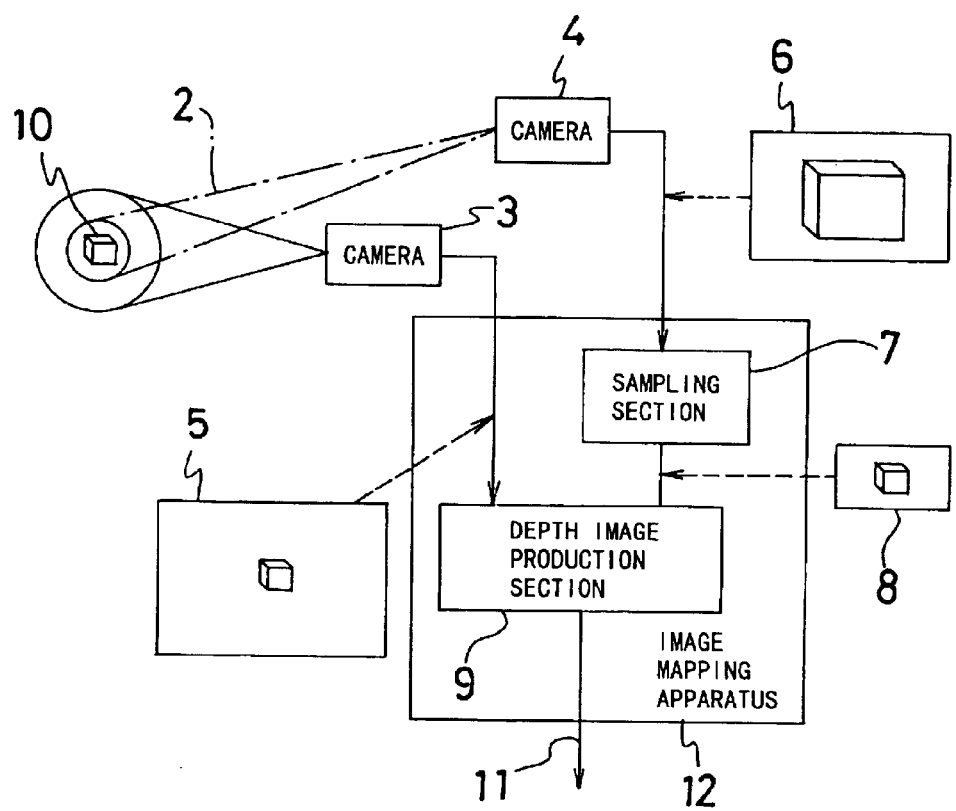
FIG. 1 is a block diagram of a three-dimensional structure estimation apparatus to which the present invention is applied.

Referring first to FIG. 1, there is shown in block diagram a three-dimensional structure estimation apparatus to which the present invention is applied. The three-dimensional structure estimation apparatus shown includes a wide visual field camera 3 having a wide visual field cone 1 of a wide visual field and a narrow visual field camera 4 having a narrow visual field cone 2 of a narrow visual field. The wide visual field camera 3 and the narrow visual field camera 4 are set so that the visual fields thereof catch a same imaging target 10. The wide visual field camera 3 catches and images the imaging target 10, which makes a target of estimation of a three-dimensional structure, in the wide visual field cone 1 thereof and outputs the imaged imaging target 10 as a wide visual field image 5. Similarly, the narrow visual field camera 4 catches and images the same imaging target 10 in the narrow visual field cone 2 thereof and outputs the imaged imaging target 10 as a narrow visual field image 6. Since the visual fields of the cameras 3 and 4 are different from each other, the magnitudes of the wide visual field image 5 and the narrow visual field image 6 outputted from the cameras 3 and 4 are different from each other. If it is assumed that the resolutions of the wide visual field camera 3 and the narrow visual field camera 4 are equal to each other, then the wide visual field image 5 produced by the wide visual field camera 3 exhibits a smaller imaging target than the narrow visual field image 6 produced by the narrow visual field camera 4, and the wide visual field image 5 is lower in resolution than the narrow visual field image 6.

The wide visual field image 5 and the narrow visual field image 6 outputted from the cameras 3 and 4, respectively, are inputted to an image mapping apparatus 12 in order to adjust the magnitudes of pixel units to each other. The image mapping apparatus 12 includes a sampling section 7 and a depth image production section 9. Here, the narrow visual field image 6 is inputted to and sampled by the sampling section 7 and outputted as a coincident pixel unit image 8, wherein the magnitude of a pixel unit is equal to that of the wide visual field image 5, to the depth image production section 9.

Conventional stereo methods are not suitable for images having different pixel units. In the three-dimensional structure estimation apparatus of the present invention, the narrow visual field image 6 of a high resolution is contracted by the sampling section 7, which serves as a conversion element for making the resolution of the narrow visual field image 6 coincide with that of the wide visual field image 5, and is inputted as a coincident pixel unit image 8 to the depth image production section 9. The sampling section 7 processes the thus contracted coincident pixel unit image 8 and the wide visual field image 5 of a low resolution using a standard stereo method to produce and output a depth image wherein depthwise distances of the individual pixels are formed as an image.

A standard stereo image inputting system acquires a very redundant image pair using a plurality of cameras having a same visual field and an equal resolution. However, the three-dimensional structure estimation apparatus according to the present invention uses, in order to acquire images having different resolutions from each other, lenses and camera bodies adjusted so as to have different visual fields.

Accordingly, by varying the resolution which is required only for stereo processing, a wide visual range and a large depth measurement allowable range are realized while decreasing the redundancy of image information.

Subsequently, a relationship of a plurality of cameras having different visual fields is described with reference to FIG. 2.

Figure 2:
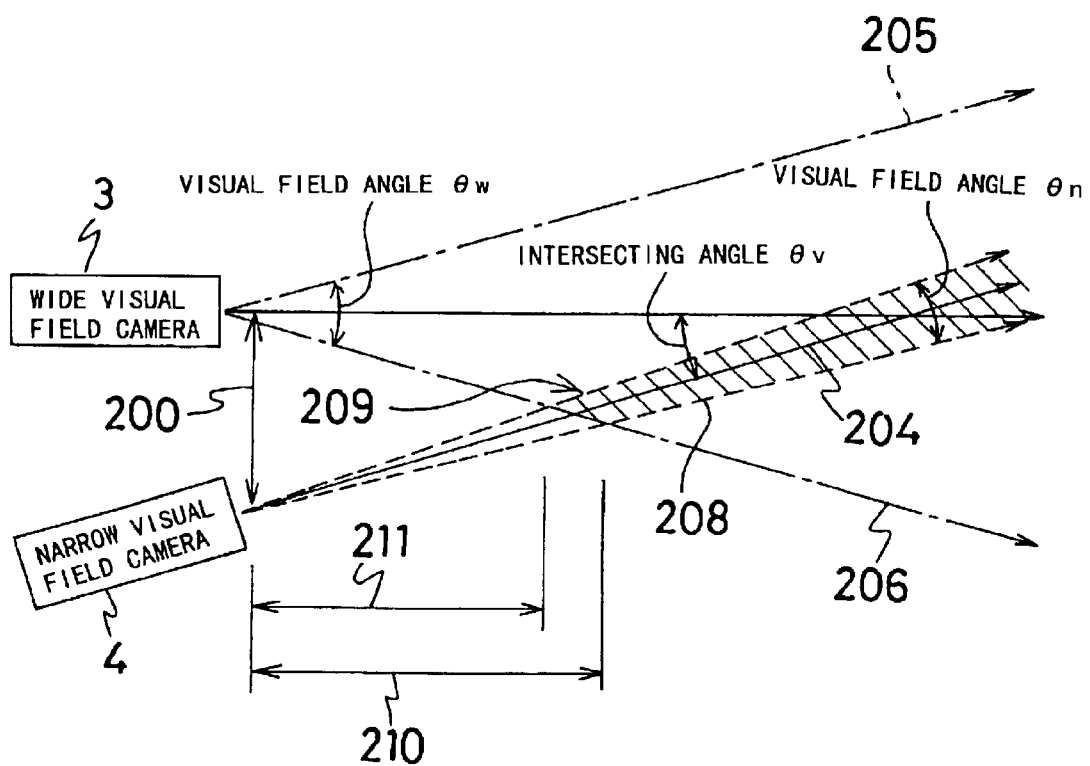
FIG. 2 is a diagrammatic view illustrating a depth estimation allowable range of the three-dimensional structure estimation apparatus of FIG. 1.

As seen from FIG. 2, two cameras having visual fields of different widths, that is, the wide visual field camera 3 and the narrow visual field camera 4, are provided in a spaced relationship by a certain distance from each other on a baseline 202.

The wide visual field camera 3 has a visual field of a wide visual field angle θw defined by visual field boundary lines 205 and 206. Meanwhile, the narrow visual field camera 4 has another visual field of a narrow visual field angle θn defined by visual field boundary lines 207 and 208. A common visual field region 209 indicated by slanting lines in FIG. 2 which is a common visual field region common between the visual field of the wide visual field camera 3 and the visual field of the narrow visual field camera 4 is a region in which depth estimation by a stereo method is possible.

The common visual field region 209 extends to the infinite point where the visual field boundary line 205 of the wide visual field camera 3 and the visual field boundary line 207 of the narrow visual field camera 4 are open in the endwise directions thereof. Further, where the visual field boundary lines 205 and 207 extend in parallel to each other, the common visual field region 209 exhibits a maximum region. In particular, where the intersecting angle of the optical axes 203 and 204 of the two cameras 3 and 4 is represented by "θv", the common visual field region 209 exhibits its maximum region if the cameras 3 and 4 are arranged so that the intersecting angle θv satisfies a relationship with the wide visual field angle θw and the narrow visual field θn as given by the following expression (1):

$$\theta v = (\theta w - \theta n)/2 \qquad (1)$$

The point at which the visual field boundary lines 206 and 208 intersect with each other is the position at a shortest fetching distance 210 which is the nearest position to which a stereo method can be applied, and depth estimation is possible within the range from the position just mentioned to the infinite point.

The three-dimensional structure estimation apparatus of the present invention which employs cameras having different visual fields as described above is advantageous in the following points comparing with conventional method wherein similar cameras are used.

Firstly, since the three-dimensional structure estimation apparatus of the present invention allows application of a stereo method over a very long depthwise range comparing with conventional three-dimensional structure estimation apparatus, there is no necessity of varying the directions of the cameras 3 and 4 every time depending upon the depthwise position of an object which makes a target of measurement. Further, even if the object which makes a target of measurement goes out of the common visual field region 209, the object can be traced by turning the entire arrangement of the two cameras 3 and 4 while the relative positions of the cameras 3 and 4 are fixed. Consequently, the individual camera positions are not varied, and accordingly, the accuracy in depth estimation is not influenced by such movement of the object which makes a target of measurement. Further, only if the visual field boundary line 205 of the wide visual field camera 3 and the visual field boundary line 207 of the narrow visual field camera 4 are open in the endwise directions, then since the common visual field region extends to the infinite point, setting of the cameras is easy.

Secondly, not only depth information can be obtained by applying a stereo method using only the two cameras 3 and 4 shown in FIG. 2, but also both of an image of a wide visual field whose corresponding size in an actual space per pixel unit is comparatively large and another image of a narrow visual field whose corresponding size is comparatively small can be obtained. Consequently, the three-dimensional structure estimation apparatus is advantageous where it is intended to extract various information including information in addition to depth information using a number of cameras as small as possible. For example, the three-dimensional structure estimation apparatus can be constructed in a similar manner as in a structure of an eye of a human being wherein vision cells are present densely for a region which must be watched carefully whereas, for other regions therearound, vision cells are present roughly so that information can be obtained over a wide range while the density thereof is low.

According to the present invention, which pixels of an image (narrow visual field image 6) imaged by the narrow visual field camera 4 in FIG. 2 and smaller in size of a pixel unit correspond to the positions of pixels of another image (wide visual field image 5) imaged by the wide visual field camera 3 and larger in size of a pixel unit is preferably examined particularly based on a plurality of images produced by successive sampling of the narrow visual field image 6 while the sampling points of pixels are successively moved parallelly.

In conventional three-dimensional structure estimation apparatus, since images of an equal resolution are used, if it is intended to obtain a degree of accuracy higher than a pixel unit, then brightness values between pixels are estimated using some interpolation method. Where such interpolation is used, the accuracy cannot be raised sufficiently because of an error by estimation. However, with the three-dimensional structure estimation apparatus of the present invention, a depth distance of a higher degree of accuracy can be obtained.

FIG. 5 illustrates an example of sampling processing employed in the three-dimensional structure estimation apparatus of the present invention. Referring to FIG. 5, the sampling section 7 of FIG. 1 can realize coincidence between pixel units by sampling processing wherein, where the ratio between actually corresponding sizes of pixel units of the wide visual field image 5 and the narrow visual field image 6 is, for example, "1:3", sampling is performed at the rate of one pixel per "3×3" pixels. The sampling processing of sampling one pixel per "3×3" pixels corresponds, where FIG. 5 shows the narrow visual field image 6, to an operation of extracting only values of those of the pixels which are at positions indicated by "1".

Further, such sampling processing can be realized, where the ratio in size is a real number such as "1:2.5", by performing suitable interpolation processing first and then extracting pixel values at pertaining pixel positions. As a result of the processing, the imaging target 10 is imaged in an equal size in both of the wide visual field image 5 and the coincident pixel unit image 8, and consequently, a conventional stereo method can be applied as it is.

The wide visual field image 5 and the coincident pixel unit image 8 are inputted to the depth image production section 9, by which mapping for each pixel is performed between the two images using a stereo method to estimate the depth at each pixel position. The thus estimated depth values are outputted as a depth image 11 to the outside.

By the three-dimensional structure estimation apparatus having the construction described above, an image of a wide visual field and another image which has a high resolution at part of the visual field are provided and a three-dimensional structure of an object in the visual field can be estimated.

Now, another three-dimensional structure estimation apparatus to which the present invention is applied is described with reference to FIG. 3.

The present three-dimensional structure estimation apparatus is a modification to and different from the three-dimensional structure estimation apparatus of the first embodiment described hereinabove with reference to FIG. 1 in that it includes, in place of the image mapping apparatus 12, an image mapping apparatus 300 to which a wide visual field image 5 and a narrow visual field image 6 are inputted. The image mapping apparatus 300 includes a sampling section 301, a depth image set production section 303 and a depth selection image production section 305. The depth image set production section 303 and the depth selection image production section 305 cooperatively form depth image production means.

Figure 3:
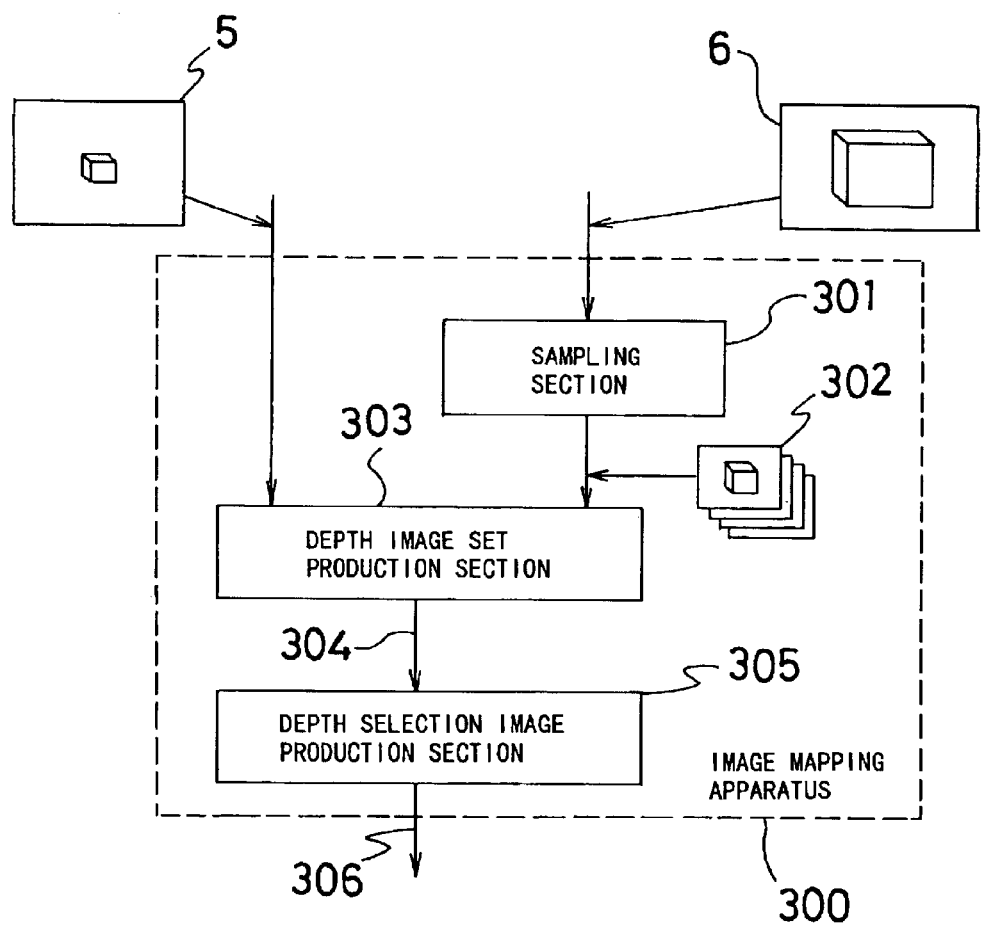
FIG. 3 is a block diagram of another three-dimensional structure estimation apparatus to which the present invention is applied.

The narrow visual field image 6 imaged by a narrow visual field camera not shown in FIG. 3 is inputted to the sampling section 301. The sampling section 301 makes the magnitude of a pixel unit coincide with that of a pixel unit of the wide visual field image 5 and samples pixels to produce a coincident pixel unit image set 302 which includes images obtained by little by little successive parallel movement of the sampling positions.

Subsequently, this sampling processing is described with reference to FIG. 5. The sampling section 301 of FIG. 3 can realize coincidence of pixel units by sampling processing wherein, where the ratio between actually corresponding sizes of pixel units of the wide visual field image 5 and the narrow visual field image 6 is, for example, "1:3", sampling is successively performed at the rate of one pixel per "3×3" pixels while the sampling positions are successively shifted or moved parallelly. The sampling processing of sampling one pixel per "3×3" pixels corresponds, where FIG. 5 shows the narrow visual field image 6, to an operation of successively extracting only values of those of the pixels which are at positions indicated by "1", "2" and "3" to produce three images.

Further, such sampling processing can be realized, where the ratio in size is a real number such as "1:2.5", by performing suitable interpolation processing first and then extracting pixel values at pertaining pixel positions.

The wide visual field image 5 imaged by a wide visual field camera not shown in FIG. 3 and the coincident pixel unit image set 302 are inputted to the depth image set production section 303. The depth image set production section 303 searches for pixels which correspond to each other between the wide visual field image 5 and each coincident pixel unit coincident image in the coincident pixel unit image set 302, produces depth images for the individual pairs to produce a depth image set 304 and outputs the depth image set 304 to the depth selection image production section 305.

For each pixel position of each of the depth images outputted as the depth image set 304, an index representative of a degree of appropriateness of depth estimation is added. This index is, for example, a finite difference between pixel values at corresponding pixel positions. The depth image set 304 is inputted to the depth selection image production section 305.

The depth selection image production section 305 performs, for all pixels, an operation of comparing, for each pixel position of the depth images, a plurality of degrees of appropriateness of depth estimation indicated by the depth image set 304 to select one depth which exhibits the most appropriate estimation to produce a depth image 306 and outputs the depth image 306.

By the three-dimensional structure estimation apparatus having the construction described above, an image of a wide visual field and another image which has a high resolution at part of the visual field are provided and a higher resolution three-dimensional structure of an object in the visual field can be estimated.

Now, a further three-dimensional structure estimation apparatus to which the present invention is applied is described with reference to FIG. 4.

The present three-dimensional structure estimation apparatus is a modification to and different from the three-dimensional structure estimation apparatus of the first embodiment described hereinabove with reference to FIG. 1 in that it includes, in place of the image mapping apparatus 12; an image matching apparatus 400 to which a wide visual field image 5 and a narrow visual field image 6 are inputted. The image matching apparatus 400 includes a display image interpolation section 401 and a depth image production section 403.

Figure 4:
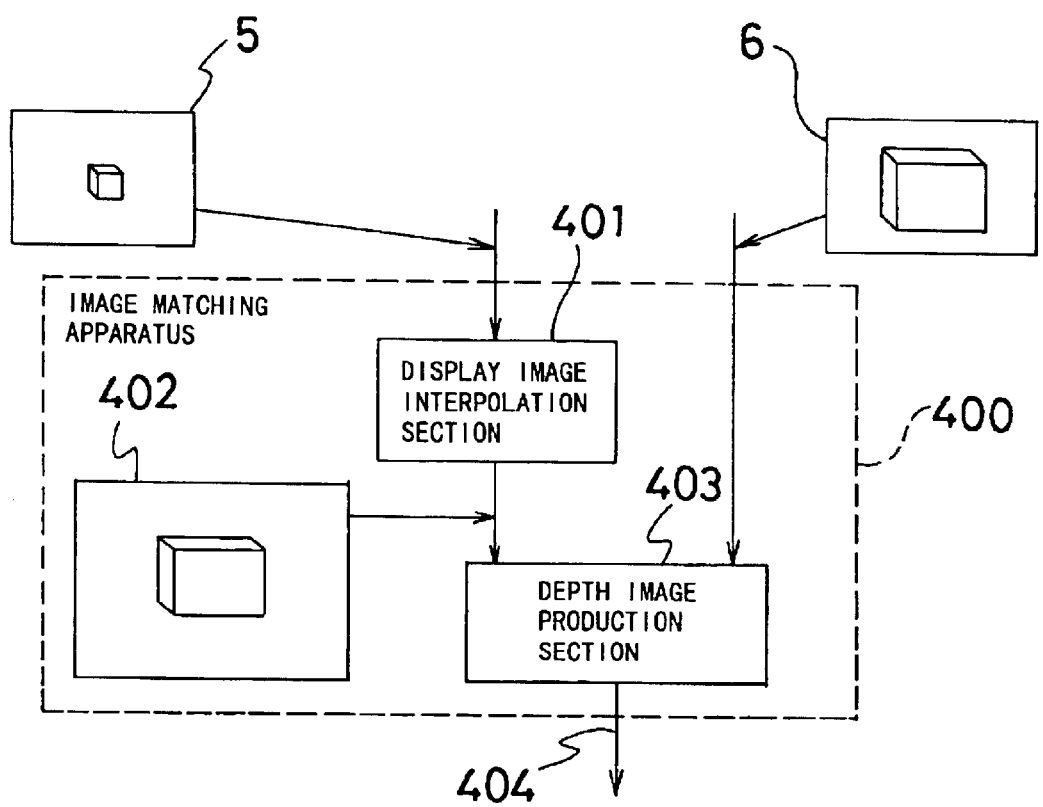
FIG. 4 is a block diagram of a further three-dimensional structure estimation apparatus to which the present invention is applied.
Figure 6:
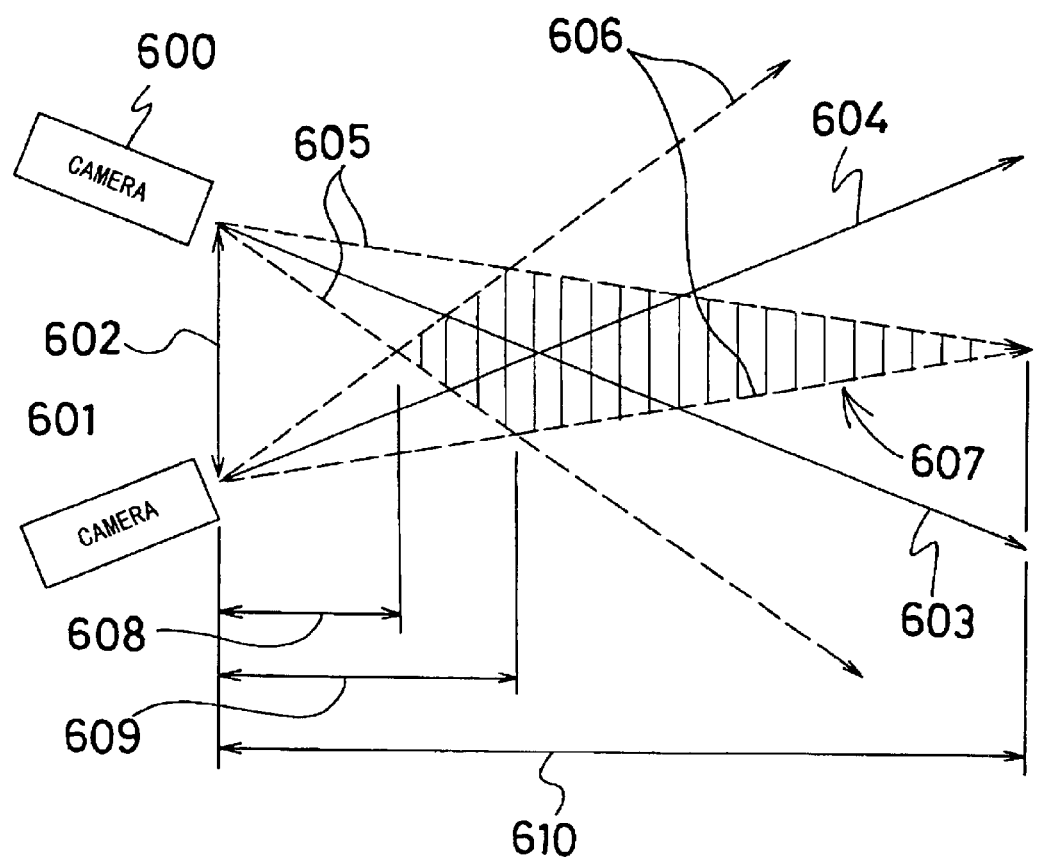
FIG. 6 is a diagrammatic view illustrating a conventional stereo method.

The wide visual field image 5 imaged by a wide visual field camera not shown in FIG. 4 is inputted to the display image interpolation section 401, by which it is enlarged so that the magnitude of a pixel unit thereof may coincide with that of the narrow visual field image 6. The thus enlarged image is outputted as a coincident pixel unit image 402 to the depth image production section 403. For the enlarging operation, any interpolation method can be used if pixel values at positions between pixels are estimated and interpolated including linear secondary interpolation which is used popularly.

The coincident pixel unit image 402 and the narrow visual field image 6 imaged by a narrow visual field camera not shown in FIG. 4 are inputted to the depth image production section 403. The depth image production section 403 calculates pixel positions at which individual pixels of the two input images correspond to each other to estimate the depths and outputs resulting depth values as a depth image 404.

By the three-dimensional structure estimation apparatus having the construction described above, an image of a wide visual field and another image which has a high resolution at part of the visual field are provided and a higher resolution three-dimensional structure of an object in the visual field can be estimated.

While, in the three-dimensional structure estimation apparatus of the embodiments described above, cameras having visual fields of different widths are used and a sampling section or an image interpolation section suitable for the cameras is utilized, instead it is possible to employ cameras having different resolutions and a sampling section or an image interpolation suitable for the cameras. It is otherwise possible to use both of cameras having visual fields of different widths and cameras having different resolutions and use a sampling section or an image interpolation section which adjusts pixel units of images obtained from the cameras to each other.

Having now fully described the invention, it will be apparent to one of ordinary skill in the art that many changes and modifications can be made thereto without departing from the spirit and scope of the invention as set forth herein.

What is claimed is:

1. A method for measuring a distance to an object, comprising:

producing a first image of the object using a first camera;

producing a second image of the object using a second camera spaced apart from the first camera along a common baseline and having a different viewing angle than the first camera, the second camera having a resolution that is greater than the resolution of the first camera such that pixel units of the image produced by the first camera represent a greater amount of the object than pixel units of the image produced by the second camera;

producing a set of sampled images, each of the sampled images being produced by sampling pixels of the second image at given intervals beginning at respective different locations in the second image for each sampled image;

calculating a set of distances to the object corresponding to the set of sampled images, each distance being calculated based on the positions of the cameras on the common baseline, the directions of the first and second cameras with respect to the common baseline, and the locations of a common point on the object in the first image and the respective sampled image;

calculating a set of indexes, each respective index being representative of the degree of appropriateness of a distance corresponding to one of the sampled images; and selecting one of the respective distances to the object based on the index associated with its corresponding sampled image.

2. The method claimed in claim 1, wherein the second image is interpolated prior to producing the set of sampled images.

3. The method claimed in claim 1, wherein the index corresponding to a sampled image represents the difference between a pixel value of the sampled image and a pixel value at a corresponding pixel of the first image.

4. A method for measuring a distance to an object, comprising:

producing a first image of the object using a first camera;

producing a second image of the object using a second camera spaced apart from the first camera along a common baseline and having a different viewing angle than the first camera, the second camera having a field of view that is less than the field of view of the first camera such that pixel units of the image produced by the first camera represent a greater amount of the object than pixel units of the image produced by the second camera;

producing a set of sampled images, each of the sampled images being produced by sampling pixels of the second image at given intervals beginning at respective different locations in the second image for each sampled image;

calculating a set of distances to the object corresponding to the set of sampled images, each distance being calculated based on the positions of the cameras on the common baseline, the directions of the first and second cameras with respect to the common baseline, and the locations of a common point on the object in the first image and the respective sampled image;

calculating a set of indexes, each respective index being representative of the degree of appropriateness of a distance corresponding to one of the sampled images; and selecting one of the respective distances to the object based on the index associated with its corresponding sampled image.

5. The method claimed in claim 4, wherein the second image is interpolated prior to producing the set of sampled images.

6. The method claimed in claim 4, wherein the index corresponding to a sampled image represents the difference between a pixel value of the sampled image and a pixel value at a corresponding pixel of the first image.

7. An apparatus for measuring a distance to an object, comprising:

a first camera for producing a first image of the object;

a second camera for producing a second image of the object, the second camera being spaced apart from the first camera along a common baseline and having a different viewing angle than the first camera, the second camera having a resolution that is greater than the resolution of the first camera such that pixel units of the image produced by the first camera represent a greater amount of the object than pixel units of the image produced by the second camera; and a data processing section performing processing comprising:

producing a set of sampled images, each of the sampled images being produced by sampling pixels of the second image at given intervals beginning at respective different locations in the second image for each sampled image;

calculating a set of distances to the object corresponding to the set of sampled images, each distance being calculated based on the positions of the cameras on the common baseline, the directions of the first and second cameras with respect to the common baseline, and the locations of a common point on the object in the first image and the respective sampled image;

calculating a set of indexes, each respective index being representative of the degree of appropriateness of a distance corresponding to one of the sampled images; and selecting one of the respective distances to the object based on the index associated with its corresponding sampled image.

8. The apparatus claimed in claim 7, wherein the second image is interpolated prior to producing the set of sampled images.

9. The apparatus claimed in claim 7, wherein the index corresponding to a sampled image represents the difference between a pixel value of the sampled image and a pixel value at a corresponding pixel of the first image.

10. An apparatus for measuring a distance to an object, comprising:

a first camera producing a first image of the object;

a second camera producing a second image of the object, the second camera being spaced apart from the first camera along a common baseline and having a different viewing angle than the first camera, the second camera having a field of view that is less than the field of view of the first camera such that pixel units of the image produced by the first camera represent a greater amount of the object than pixel units of the image produced by the second camera; and a data processing section performing processing comprising:

producing a set of sampled images, each of the sampled images being produced by sampling pixels of the second image at given intervals beginning at respective different locations in the second image for each sampled image;

calculating a set of distances to the object corresponding to the set of sampled images, each distance being calculated based on the positions of the cameras on the common baseline, the directions of the first and second cameras with respect to the common baseline, and the locations of a common point on the object in the first image and the respective sampled image;

calculating a set of indexes, each respective index being representative of the degree of appropriateness of a distance corresponding to one of the sampled images; and selecting one of the respective distances to the object based on the index associated with its corresponding sampled image.

11. The apparatus claimed in claim 10, wherein the second image is interpolated prior to producing the set of sampled images.

12. The apparatus claimed in claim 10, wherein the index corresponding to a sampled image represents the difference between a pixel value of the sampled image and a pixel value at a corresponding pixel of the first image.

* * * * *